US007225532B2

(12) United States Patent
Wei

(10) Patent No.: US 7,225,532 B2
(45) **Date of Patent: *Jun. 5, 2007**

(54) TERMINAL PLIERS STRUCTURE

(76) Inventor: Shu Chen Wei, No. 13-2, Dayou 2nd St., Situn District, Taichung City (TW) 407

( * ) Notice: Subject to any disclaimer, the term of this patent is extended or adjusted under 35 U.S.C. 154(b) by 389 days.

This patent is subject to a terminal disclaimer.

(21) Appl. No.: 10/910,722

(22) Filed: Aug. 3, 2004

(65) Prior Publication Data

US 2006/0026823 A1 Feb. 9, 2006

(51) Int. Cl.
*B23P 19/00* (2006.01)

(52) U.S. Cl. ............................ 29/761; 29/757; 29/758; 29/764; 29/278

(58) Field of Classification Search .................. 29/280, 29/278, 761, 758, 764, 757, 857, 861, 863, 29/865, 866, 867, 882, 874, 884
See application file for complete search history.

(56) References Cited

U.S. PATENT DOCUMENTS 7,028,393 B2 * 4/2006 Wei .............................. 29/761

* cited by examiner

*Primary Examiner*—Richard Chang
(74) *Attorney, Agent, or Firm*—Banger Shia

(57) ABSTRACT

A terminal pliers structure includes a seat, a drive mechanism, and a clamping mechanism. The clamping mechanism includes a first clamping block, a second clamping block, and a spring. In operation, the first clamping block and the second clamping block are forced to pivot in concert with each other, thereby facilitating the user operating the terminal pliers structure, and thereby saving the manual work. In addition, the first teeth of the first clamping block mesh with the second teeth of the second clamping block to enhance the clamping force between the first clamping block and the second clamping block, so that the clamped terminal head can be clamped between the first clamping block and the second clamping block rigidly and stably.

7 Claims, 5 Drawing Sheets

TERMINAL PLIERS STRUCTURE

BACKGROUND OF THE INVENTION

1. Field of the Invention

The present invention relates to a terminal pliers structure, and more particularly to a terminal pliers structure that can facilitate the user's operation, save the manual work, and provide a better clamping effect.

2. Description of the Related Art

Usually, the communication cable is a co-axial cable whose end portion is provided with a terminal head, so that the cable can be combined with an electric appliance or plug rigidly. The terminal head is often combined with the cable in a press manner terminal pliers. A conventional terminal pliers structure in accordance with the prior art shown comprises drive unit to provide the press action, and a clamping unit for clamping the terminal head and the cable. The clamping unit includes two clamping blocks each formed with an opening, and a spring urged between the two clamping blocks to close the openings of the two clamping blocks for clamping the terminal head and the cable. The user can press and pivot the two clamping blocks so as to open the openings of the two clamping blocks, thereby placing or detaching the terminal head and the cable.

However, the two clamping blocks are operated independently, so that the user has to press the two clamping blocks simultaneously to pivot the two clamping blocks outward so as to open the openings of the two clamping blocks, thereby causing inconvenience in operation. In addition, the two clamping blocks are not combined with each other rigidly, so that the terminal head and the cable are easily detached from the two clamping blocks.

SUMMARY OF THE INVENTION

The primary objective of the present invention is to provide a terminal pliers structure, wherein only one of the first clamping block and the second clamping block is pressed, the first clamping block and the second clamping block are forced to pivot outward in concert with each other, thereby facilitating the user operating the terminal pliers structure, and thereby saving the manual work.

Another objective of the present invention is to provide a terminal pliers structure, wherein the first teeth of the first clamping block mesh with the second teeth of the second clamping block to provide a friction, so as to enhance the clamping force between the first clamping block and the second clamping block, so that the clamped terminal head can be clamped between the first clamping block and the second clamping block rigidly and stably.

In accordance with the present invention, there is provided a terminal pliers structure, comprising a seat, and a clamping mechanism, wherein:

the clamping mechanism is mounted on the seat and includes a first clamping block, a second clamping block, and a spring;

the first clamping block has a side formed with a first clamping recess and a plurality of first teeth located under the first clamping recess;

the second clamping block has a side formed with a second clamping recess and a plurality of second teeth located under the second clamping recess, the second teeth of the second clamping block mesh with the first teeth of the first clamping block; and the spring is urged between the first clamping block and the second clamping block.

Further benefits and advantages of the present invention will become apparent after a careful reading of the detailed description with appropriate reference to the accompanying drawings.

DETAILED DESCRIPTION OF THE INVENTION

Figure 1:
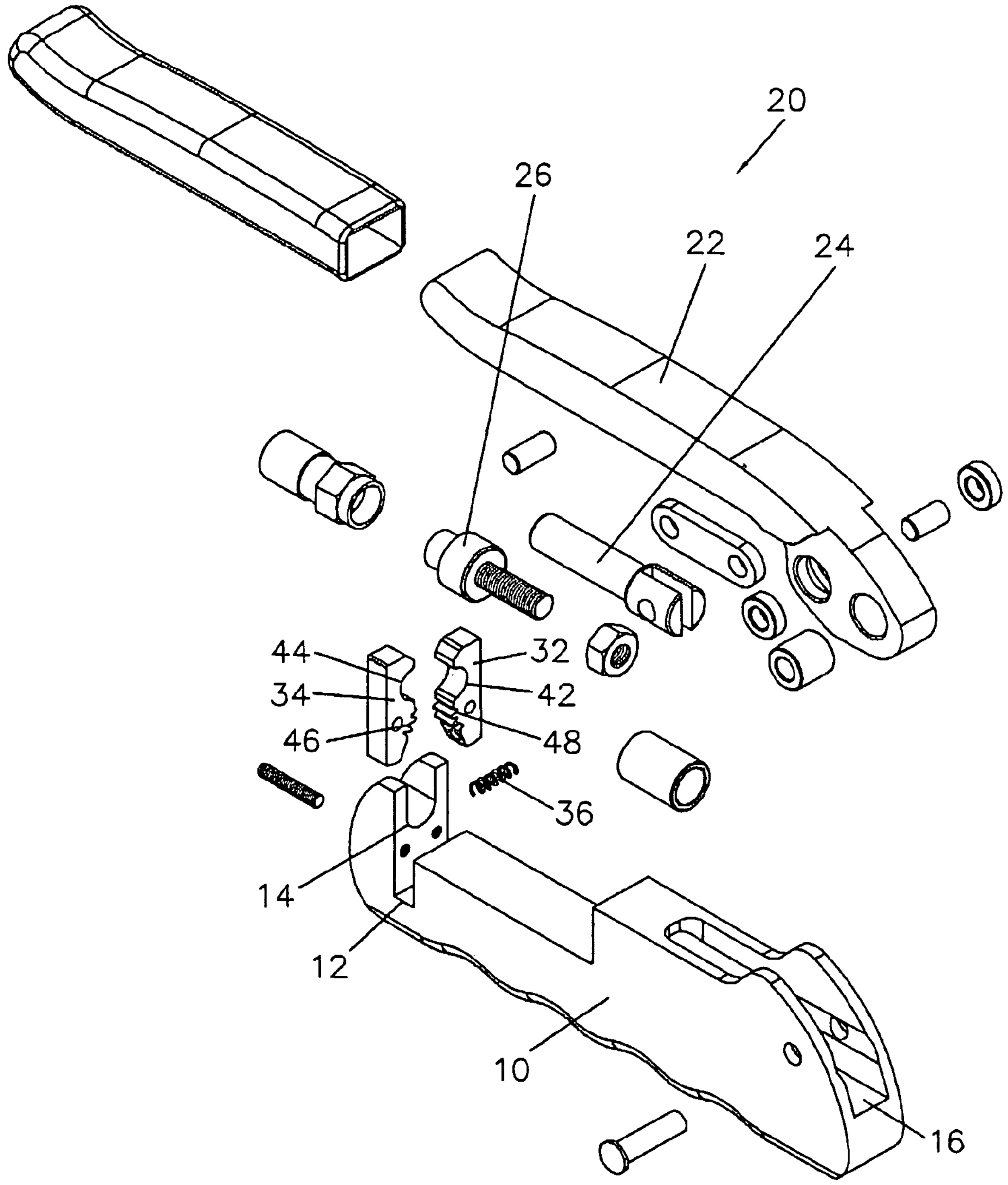
FIG. 1 is an exploded perspective view of a terminal pliers structure in accordance with the preferred embodiment of the present invention.
Figure 2:
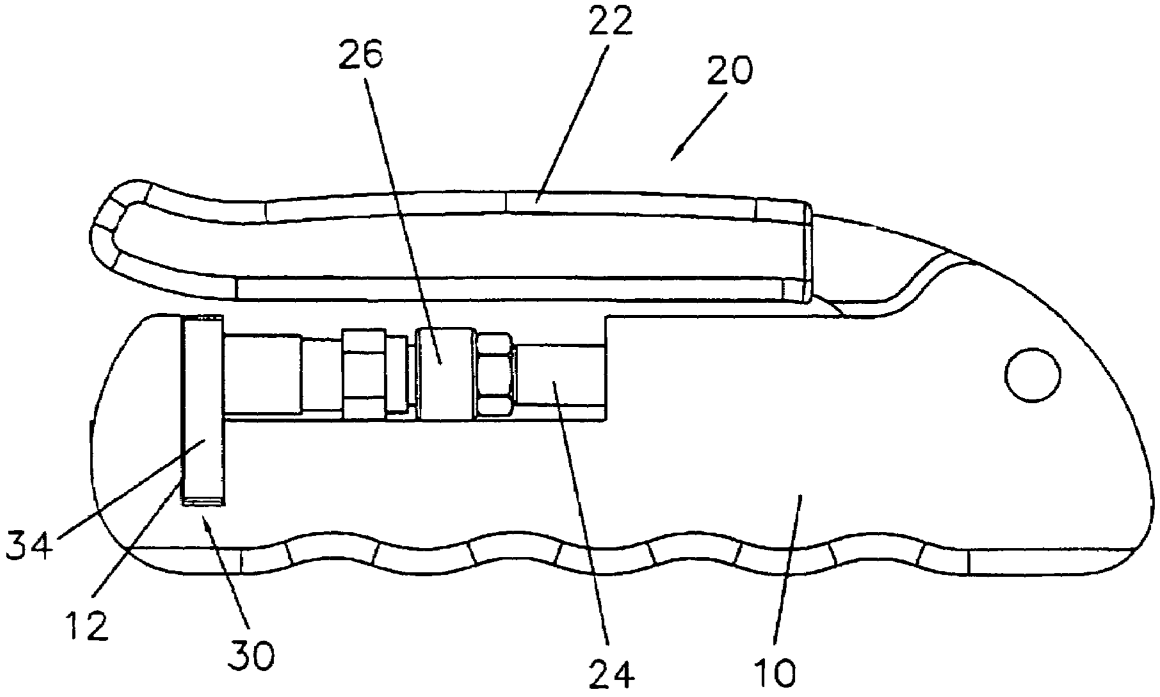
FIG. 2 is a side plan assembly view of the terminal pliers structure as shown in FIG. 1.
Figure 3:
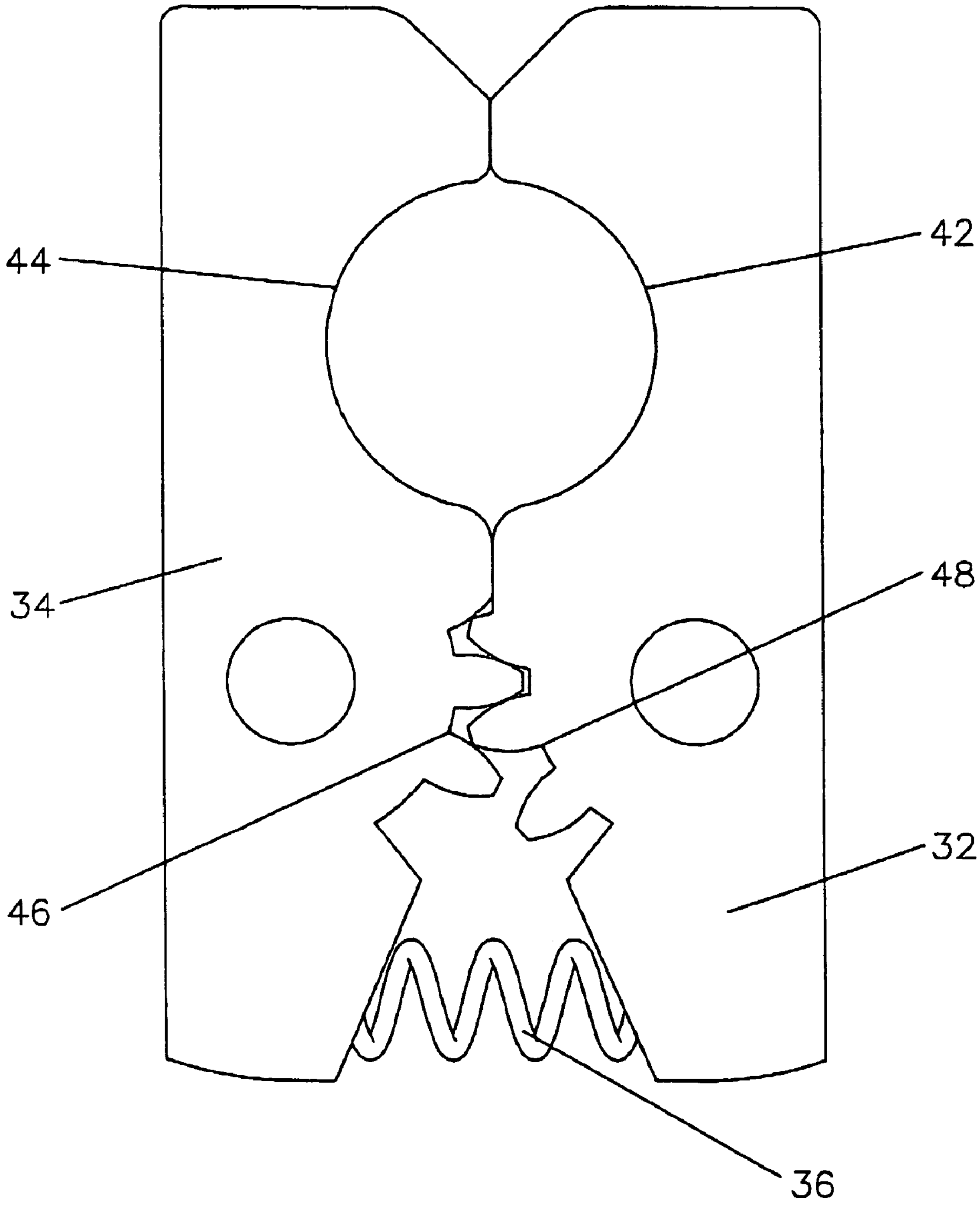
FIG. 3 is a locally schematic plan assembly view of the terminal pliers structure in accordance with the preferred embodiment of the present invention.

Referring to the drawings and initially to FIGS. 1–3, a terminal pliers structure in accordance with the preferred embodiment of the present invention comprises a seat 10, a drive mechanism 20, and a clamping mechanism 30.

The seat 10 has a first end formed with a mounting recess 12 and a second end formed with a mounting space 16. The mounting recess 12 of the seat 10 has a side wall formed with an opening 14.

The drive mechanism 20 is mounted on the seat 10, and includes an operation handle 22, a linking rod 24, and a press rod 26.

The operation handle 22 has a first end and a second end. The first end of the operation handle 22 is pivotally mounted in the mounting space 16 of the seat 10, so that the operation handle 22 is pivotally mounted on the seat 10.

The linking rod 24 has a first end combined with the first end of the operation handle 22 and mounted in the mounting space 16 of the seat 10.

The press rod 26 has a first end combined with a second end of the linking rod 24 and a second end facing the mounting recess 12 of the seat 10.

The clamping mechanism 30 (see FIG. 2) is mounted on the seat 10, and includes a first clamping block 32, a second clamping block 34, and a spring 36.

The first clamping block 32 is pivotally mounted in the mounting recess 12 of the seat 10 and has a side formed with a semi-circular first clamping recess 42 and a plurality of first teeth 48 located under the first clamping recess 42.

The second clamping block 34 is pivotally mounted in the mounting recess 12 of the seat 10 and has a side formed with a semi-circular second clamping recess 44 and a plurality of second teeth 46 located under the second clamping recess 44. The second teeth 46 of the second clamping block 34 mesh with the first teeth 48 of the first clamping block 32. The clamping recess 44 of the second clamping block 34 and the first clamping recess 42 of the first clamping block 32 are located between the opening 14 of the seat 10 and the press rod 26.

The spring 36 is mounted in the mounting recess 12 of the seat 10 and urged between the first clamping block 32 and the second clamping block 34. The spring 36 has a first end urged on the first clamping block 32 and located under the first teeth 48 and a second end urged on the second clamping block 34 and located under the second teeth 46.

Figure 4:
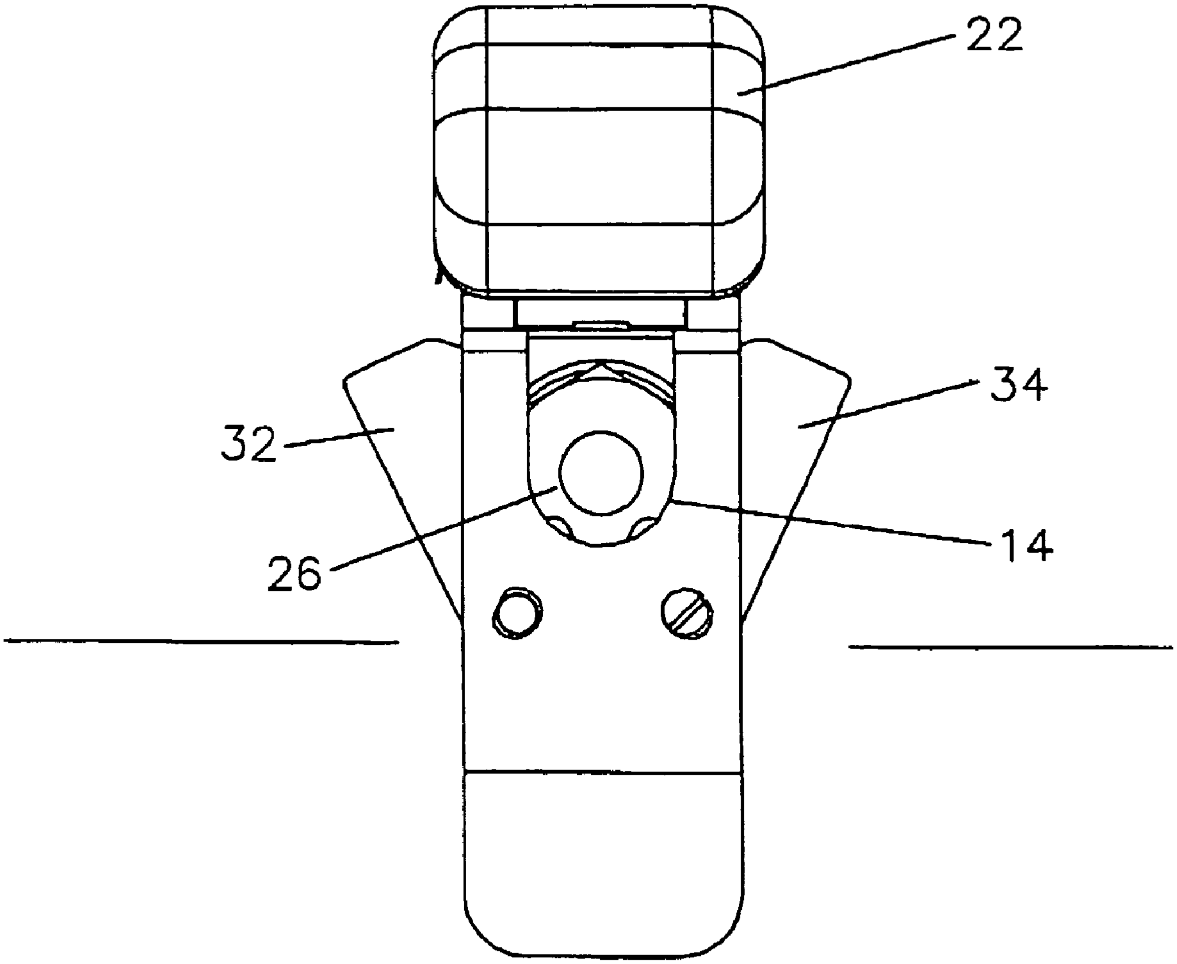
FIG. 4 is a schematic plan operational view of the terminal pliers structure in accordance with the preferred embodiment of the present invention.
Figure 5:
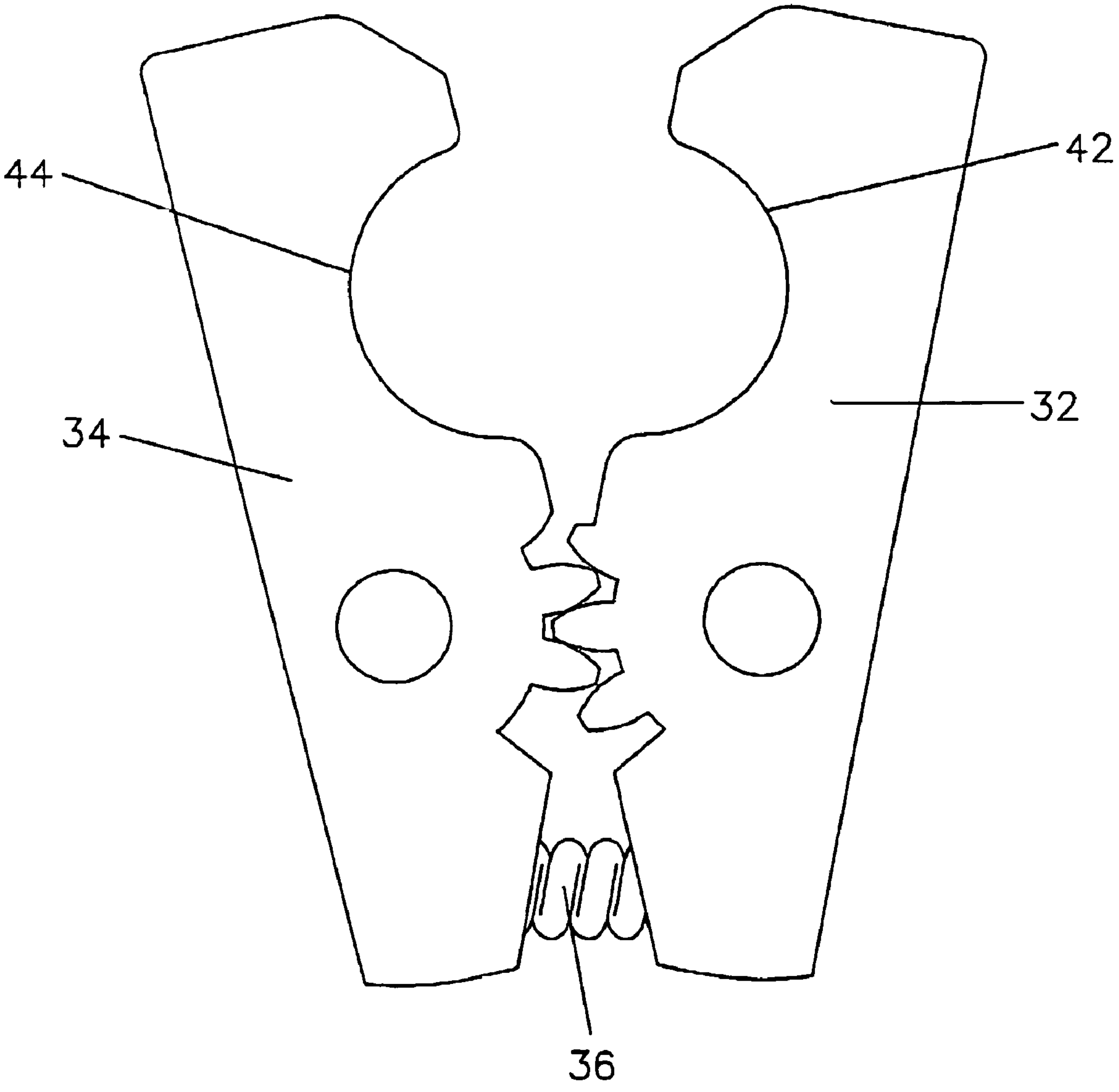
FIG. 5 is a schematic operational view of the terminal pliers structure as shown in FIG. 3 in use.

In operation, referring to FIGS. 4 and 5 with reference to FIGS. 1–3, the user can press the first clamping block 32 and the second clamping block 34 to open the first clamping recess 42 and the clamping recess 44, so that the terminal head (not shown) and the cable (not shown) can be placed in the first clamping recess 42 and the clamping recess 44 and placed in the opening 14 of the seat 10. Then, after the pressing force exerted by the user is released, the first clamping block 32 and the second clamping block 34 are forced and moved to return to the original position by the restoring force of the spring 36 to close the first clamping recess 42 and the clamping recess 44, so that the terminal head and the cable can be clamped between the first clamping recess 42 and the clamping recess 44 and can be positioned in the opening 14 of the seat 10. Then, the press rod 26 is driven by the operation handle 22 to move toward the clamped terminal head to press the clamped terminal head, so that the clamped terminal head is combined with the cable.

The first teeth 48 of the first clamping block 32 mesh with the second teeth 46 of the second clamping block 34, so that when one of the first clamping block 32 and the second clamping block 34 is pressed, the first clamping block 32 and the second clamping block 34 are forced to pivot outward in concert with each other. Thus, only one of the first clamping block 32 and the second clamping block 34 is pressed, the first clamping block 32 and the second clamping block 34 are forced to pivot outward in concert with each other, thereby facilitating the user operating the terminal pliers structure, and thereby saving the manual work.

The clamped terminal head is clamped between the first clamping block 32 and the second clamping block 34 by the clamping force applied by the spring 36. In addition, the first teeth 48 of the first clamping block 32 mesh with the second teeth 46 of the second clamping block 34 to provide a friction, so as to enhance the clamping force between the first clamping block 32 and the second clamping block 34, so that the clamped terminal head can be clamped between the first clamping block 32 and the second clamping block 34 rigidly and stably.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A terminal pliers structure, comprising a seat, and a clamping mechanism, wherein:

the clamping mechanism is mounted on the seat and includes a first clamping block, a second clamping block, and a spring;

the first clamping block has a side formed with a first clamping recess and a plurality of first teeth located under the first clamping recess;

the second clamping block has a side formed with a second clamping recess and a plurality of second teeth located under the second clamping recess, the second teeth of the second clamping block mesh with the first teeth of the first clamping block; and the spring is urged between the first clamping block and the second clamping block.

2. The terminal pliers structure in accordance with claim 1, wherein the first clamping block and the second clamping block are pivoted in concert with each other.

3. The terminal pliers structure in accordance with claim 1, wherein the spring has a first end urged on the first clamping block and located under the first teeth and a second end urged on the second clamping block and located under the second teeth.

4. The terminal pliers structure in accordance with claim 1, wherein the seat has a first end formed with a mounting recess and a second end formed with a mounting space, the mounting recess of the seat has a side wall formed with an opening.

5. The terminal pliers structure in accordance with claim 4, wherein the first clamping block is pivotally mounted in the mounting recess of the seat, the second clamping block is pivotally mounted in the mounting recess of the seat, and the spring is mounted in the mounting recess of the seat.

6. The terminal pliers structure in accordance with claim 4, further comprising a drive mechanism mounted on the seat and including an operation handle, a linking rod, and a press rod, wherein:

the operation handle has a first end and a second end, the first end of the operation handle is pivotally mounted in the mounting space of the seat;

the linking rod has a first end combined with the first end of the operation handle and mounted in the mounting space of the seat; and the press rod has a first end combined with a second end of the linking rod and a second end facing the mounting recess of the seat.

7. The terminal pliers structure in accordance with claim 6, wherein the first clamping recess of the first clamping block and the clamping recess of the second clamping block are located between the opening of the seat and the press rod.

* * * * *